(12) United States Patent  (10) Patent No.: US 7,869,604 B2
Goodman et al.  (45) Date of Patent: *Jan. 11, 2011

(54) SYSTEM FOR AN ENCRYPTION KEY PATH DIAGNOSTIC

(75) Inventors: Brian Gerard Goodman, Tucson, AZ (US); Paul Merril Greco, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 835 days.

This patent is subject to a terminal disclaimer.

(21) Appl. No.: 11/782,561

(22) Filed: Jul. 24, 2007

(65) Prior Publication Data

US 2009/0028322 A1    Jan. 29, 2009

(51) Int. Cl.
*H04L 9/00* (2006.01)
*H04L 9/32* (2006.01)
(52) U.S. Cl. ............................ 380/277; 713/193; 726/2
(58) Field of Classification Search ......... 380/277–279, 380/44, 259, 273, 33; 713/168–171; 726/2, 726/12
See application file for complete search history.

(56) References Cited

U.S. PATENT DOCUMENTS

| 2003/0074319 A1 | 4/2003 | Jaquette |
| 2007/0083759 A1 | 4/2007 | Drew et al. |
| 2007/0168664 A1 | 7/2007 | Goodman et al. |
| 2007/0192557 A1 | 8/2007 | Kezuka et al. |
| 2008/0010396 A1 | 1/2008 | Itou et al. |
| 2008/0063209 A1 | 3/2008 | Jaquette et al. |
| 2008/0065882 A1 | 3/2008 | Goodman et al. |
| 2008/0065898 A1 | 3/2008 | Greco et al. |
| 2008/0066193 A1 | 3/2008 | Hahn et al. |
| 2008/0219449 A1 | 9/2008 | Ball et al. |
| 2008/0280559 A1 * | 11/2008 | Dandekar et al. .......... 455/41.2 |

OTHER PUBLICATIONS

U.S. Appl. No. 11/782,580, Brian Gerard Goodman, et al., 'Auto Configuration of a Drive List for Encryption', pp. 1-47 (includes 12 pgs of figs.). (Application filed Jul. 24, 2007).
U.S. Appl. No. 11/782,533, Brian Gerard Goodman, et al., 'Encryption Key Path Diagnostic', pp. 1-48 (includes 12 pgs of figs.). (Application filed Jul 24, 2007).
Jaquette et al.; 'Automatically Filling a Drive Table'; U.S. Appl. No. 11/530,013; IBM; Sep. 7, 2006; pp. 1-37 (with 5 pgs of figs); USA.

* cited by examiner

*Primary Examiner*—Hosuk Song

(57) ABSTRACT

A system is provided to perform a key path diagnostic that aids in isolating an error within the encryption storage system. The system includes at least one drive, a key proxy, a key server, a key manager, and a processor. The processor performs a first communication test on a path between the key proxy and the drive. The first communication test verifies that the path between the drive and the key proxy is operational. The processor performs a second communication test on a path between the key proxy and the key server. The second communication test verifies that the path between the key proxy and the key server is operational. In addition, processor sends a command to the key manager to attempt communication with the key manager. The communication attempt verifies the installation and configuration parameters related to the key manager.

11 Claims, 12 Drawing Sheets

SYSTEM FOR AN ENCRYPTION KEY PATH DIAGNOSTIC

FIELD OF THE INVENTION

This disclosure relates to automated data storage libraries, and more particularly, to the encryption of data stored or to be stored on removable media.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compact-flash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In many applications, it is important to ensure that data stored on removable media is secure. In addition to the inconvenience and expense of having to replicate, reconstruct or re-obtain data lost to theft, misplaced cartridges, accidents, etc., there can be tremendous fallout, including legal liability, if confidential information is misappropriated.

SUMMARY OF THE INVENTION

IBM® has developed a method and a system for encrypting data on removable media. Encryption adds the concept of key proxies, key servers, key managers, etc. to automated storage libraries. Supporting data encryption may require multiple processors and/or communication paths that increase the complexity of the overall encryption storage system. Accordingly, one aspect of the present disclosure provides a system for performing a key path diagnostic that aids in isolating an error within the encryption storage system. The system includes at least one drive, a key proxy, a key server, a key manager, and a processor. The processor performs a first communication test on a path between the key proxy and the drive. The first communication test verifies that the path between the drive and the key proxy is operational. The processor performs a second communication test on a path between the key proxy and the key server. The second communication test verifies that the path between the key proxy and the key server is operational. In addition, processor sends a command to the key manager to attempt communication with the key manager. The communication attempt verifies the installation and configuration parameters related to the key manager.

DETAILED DESCRIPTION OF THE INVENTION

Figure 1:
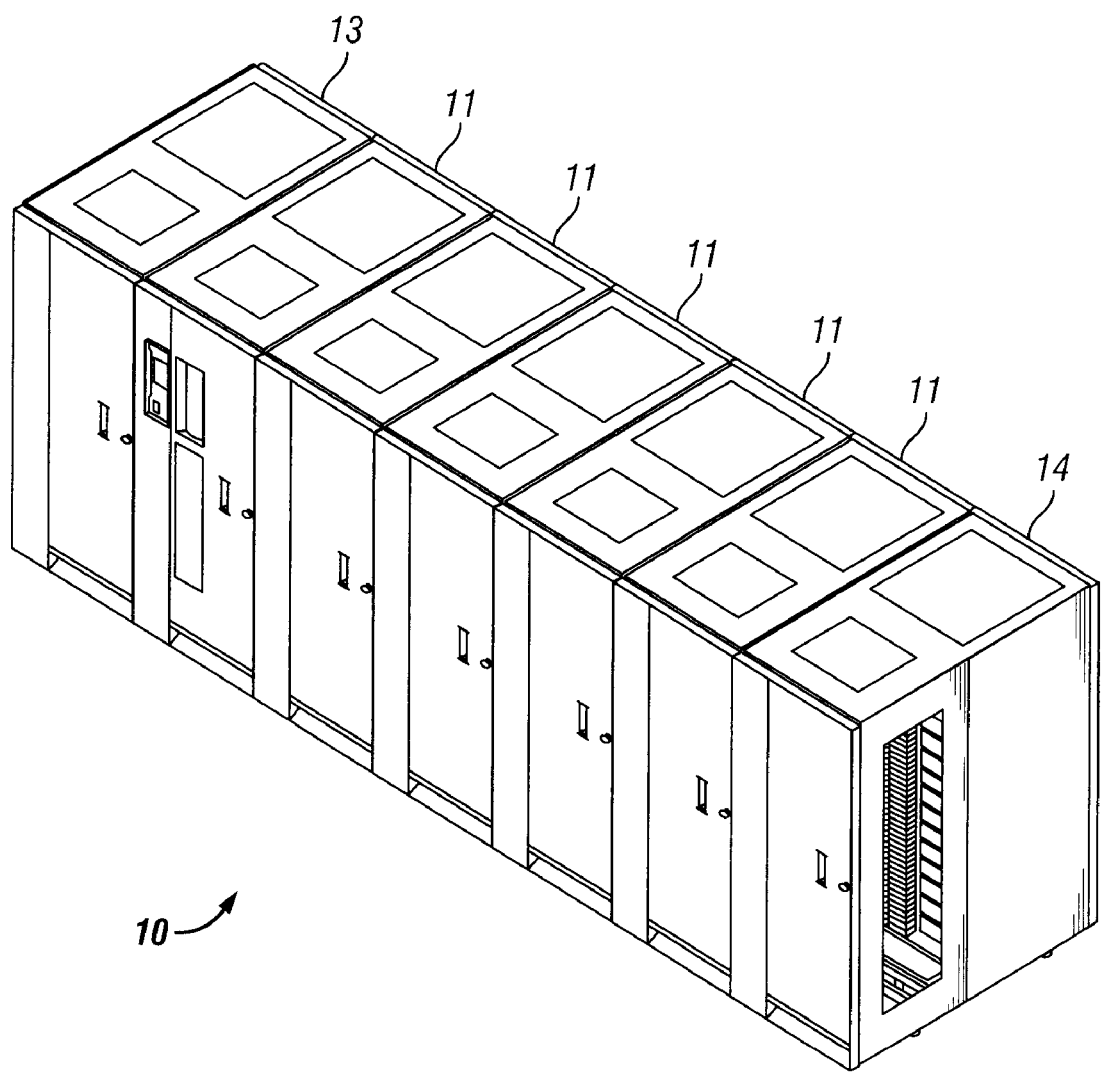
FIG. 1 is an isometric view of an automated data storage library with the view specifically depicting a library having a left hand service bay, multiple storage frames and a right hand service bay.

IBM® has developed a method and a system for encrypting data on removable media. Encryption may be described as the transformation of data into a form, called a cipher text, using one or more encryption keys that cannot be easily transformed back to the original data without the one or more decryption keys. Decryption may be described as the process of transforming the encrypted data back into its original form using one or more decryption keys.

Encryption adds the concept of key proxies, key servers, key managers, etc. to automated storage libraries. Supporting data encryption may require multiple processors and/or communication paths that increase the complexity of the overall encryption storage system. Due to the number of paths and devices involved, when an error occurs during a request or transfer of an encryption key, it is difficult to isolate where the problem occurred. For example, an error may result from a firmware, microcode, or software bug. In another example, a component may fail or there may be a break in connection, such as an Ethernet connection. Finally, the key transfer process may request a key from a key server that may not have a key manager, or the drive that a key request is related to may not be a drive that is in an authorized drive list.

One embodiment of the present disclosure is a key path diagnostic that aids in isolating an error within the encryption storage system. The method, system, and computer program product provides a first communication test to verify that the path between the drive and the key proxy is operational, a second communication test to verify that the path between the key proxy and the key server is operational, and further attempts communication with the key manager in the data storage system by sending a command to verify installation and configuration parameters related to the key manager.

An additional embodiment includes auto configuration of the drive list within the key manager. The auto configuration may be accomplished either by running the key path diagnostic or by running another command or request. The key manager determines if the drive is an authorized drive on the drive list. In one embodiment the key manager, upon determining that the drive is not an authorized drive or a drive that is not in the drive list may add the drive to the drive list, making it an authorized drive for receiving encryption keys. In another embodiment, rather than automatically adding the drive to the drive list a user interface prompts an operator to confirm the addition of one or more drives to the drive list.

The method of auto configuring greatly simplifies the process of adding drives to the key manager because some or all of the necessary information is routed through the communication between the drive and the key manager during the key path diagnostic. To avoid an unintentional configuration, the method may further prompt an operator to confirm the addition of a drive to the drive list. Thus, the chance of human error, and the time consuming and complicated task of manually entering the drive and the drive's related information is reduced or eliminated.

This invention is described in preferred embodiments in the following description with reference to the Figures, in which like numerals represent the same or similar elements. The following is intended to provide a detailed description of an example of the invention and should not be taken to be limiting of the invention itself. Rather, any number of variations may fall within the scope of the invention which is defined in the claims following the description.

The embodiments will be described as embodied in an automated magnetic tape library storage system for use in a data processing environment. Although the embodiments shown use magnetic tape cartridges, one skilled in the art will recognize the embodiments equally apply to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 2:
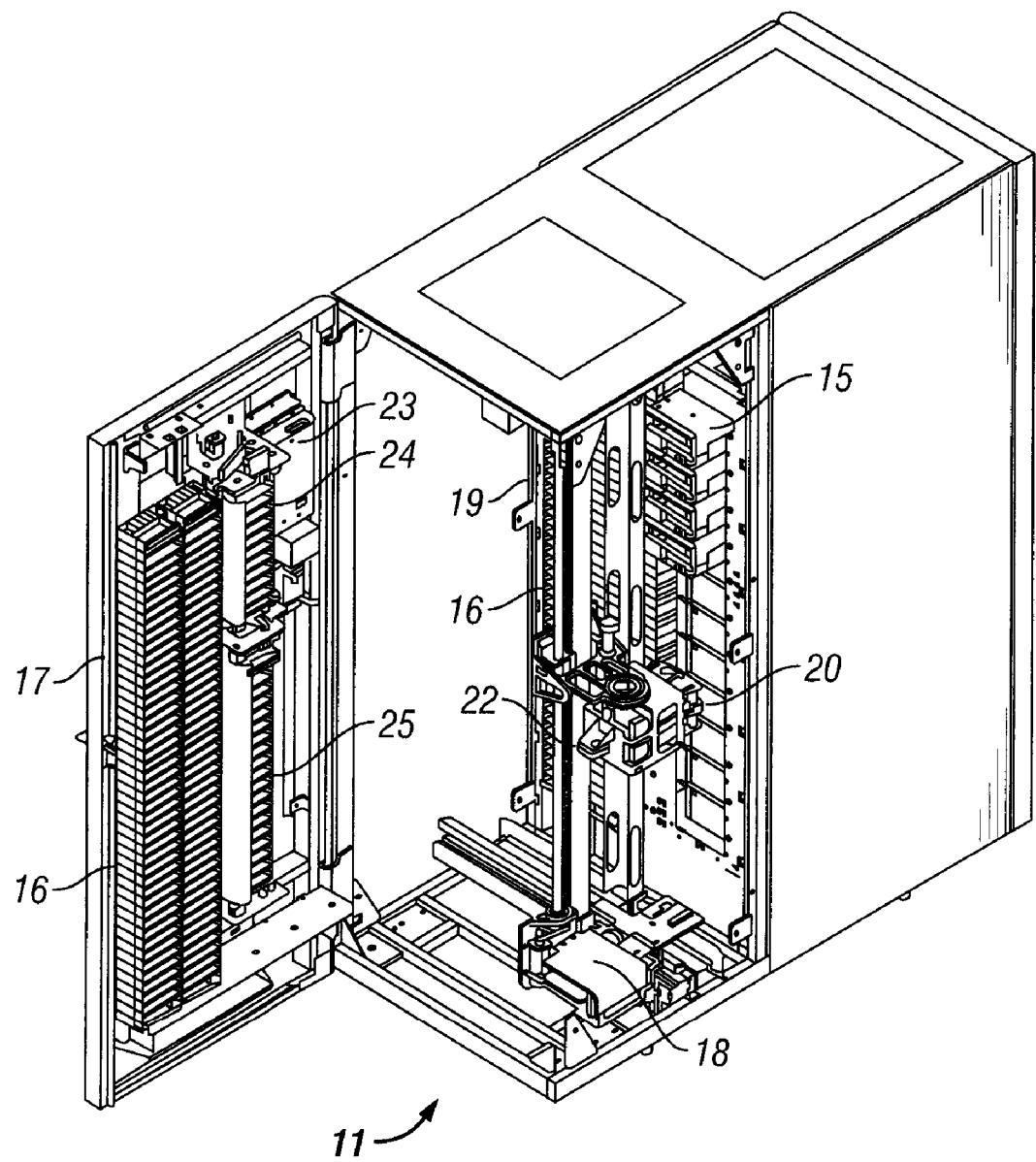
FIG. 2 is an isometric view of an automated data storage library with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may be used in the described embodiments is the IBM 3584 UltraScalable Tape Library, and has a configuration as depicted in FIGS. 1 and 2. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16, on front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
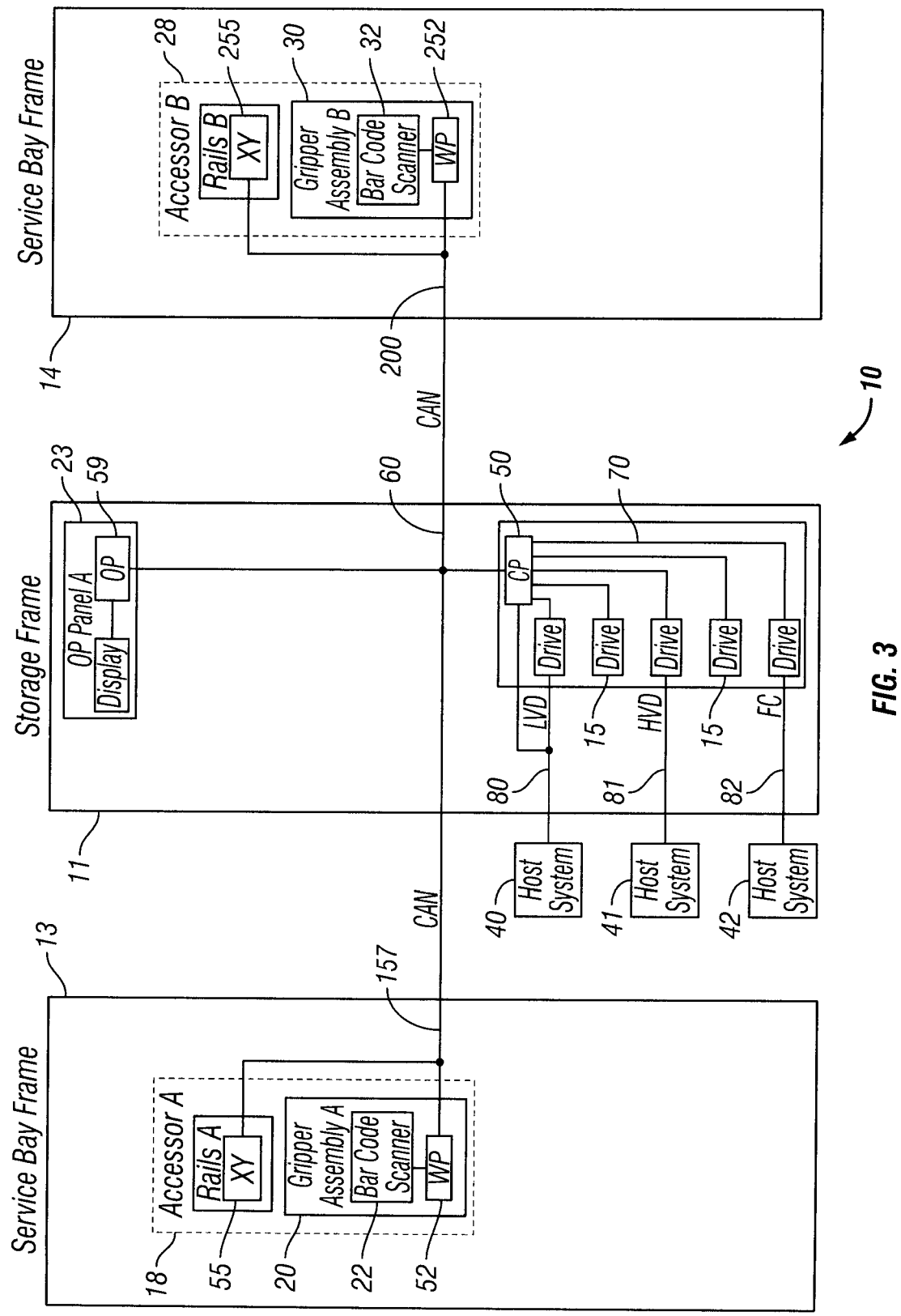
FIG. 3 is a block diagram of an automated data storage library with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the described embodiments, is the IBM 3584 UltraScalable Tape Library.

While the automated data storage library 10 has been described as employing a distributed control system, the described embodiments may be implemented in automated data storage libraries regardless of control configuration, such as, but not limited to, an automated data storage library having one or more library controllers that are not distributed. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the library/drive interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, RS-422, USB (Universal Serial Bus), SAS (Serial Attached SCSI), etc. The data storage drives 15 are thus individually coupled to the communication processor node 50 by means of lines 70. Alternatively, the data storage drives 15 may be coupled to the communication processor node 50 through one or more networks, such as CAN, Ethernet, etc.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
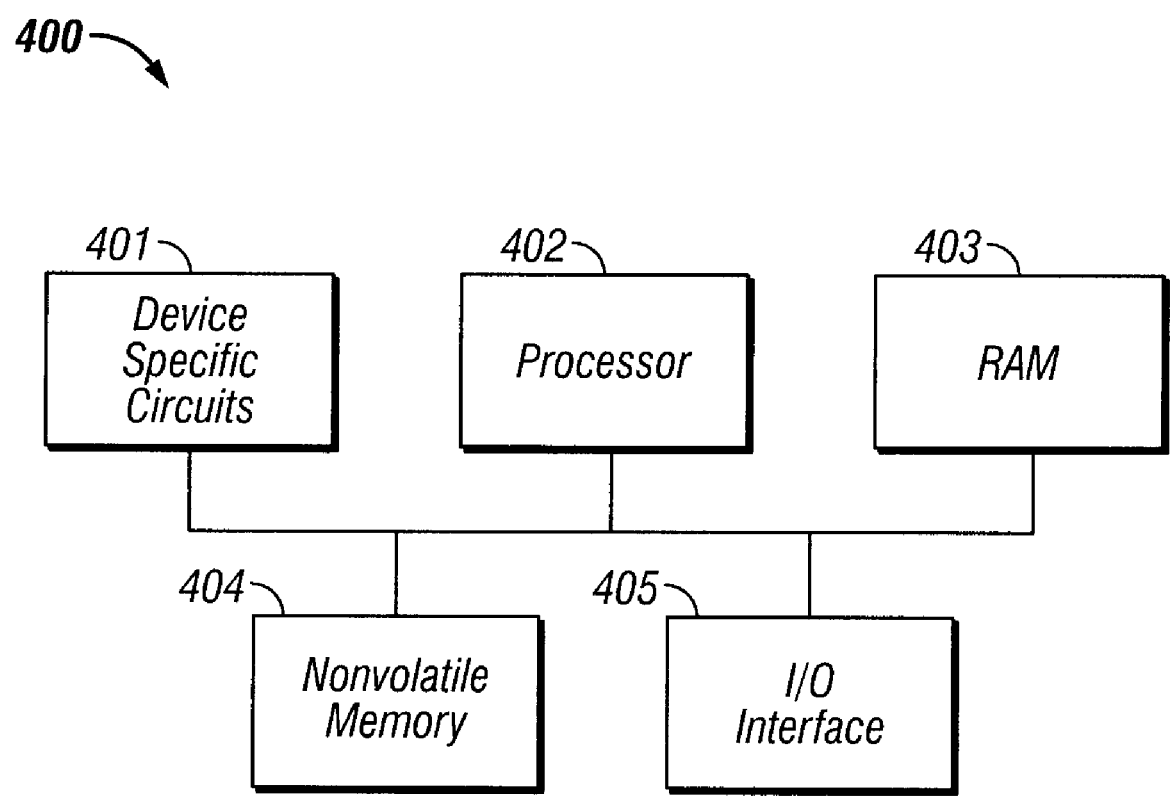
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CompacFlash, SD (Secure Digital), CD (Compact Disk), DVD (Digital Versatile Disk), hard disk drives, etc. The nonvolatile memory 404 is typically used to hold the executable firmware and any nonvolatile data. The I/O interface 405 comprises a communication interface that allows the processor 402 to communicate with devices external to the controller 400. Examples may comprise, but are not limited to, serial interfaces such as RS-232, USB (Universal Serial Bus), SCSI (Small Computer Systems Interface), Fibre Channel, Ethernet, SAS (Serial Attached SCSI), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the described embodiments may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5:
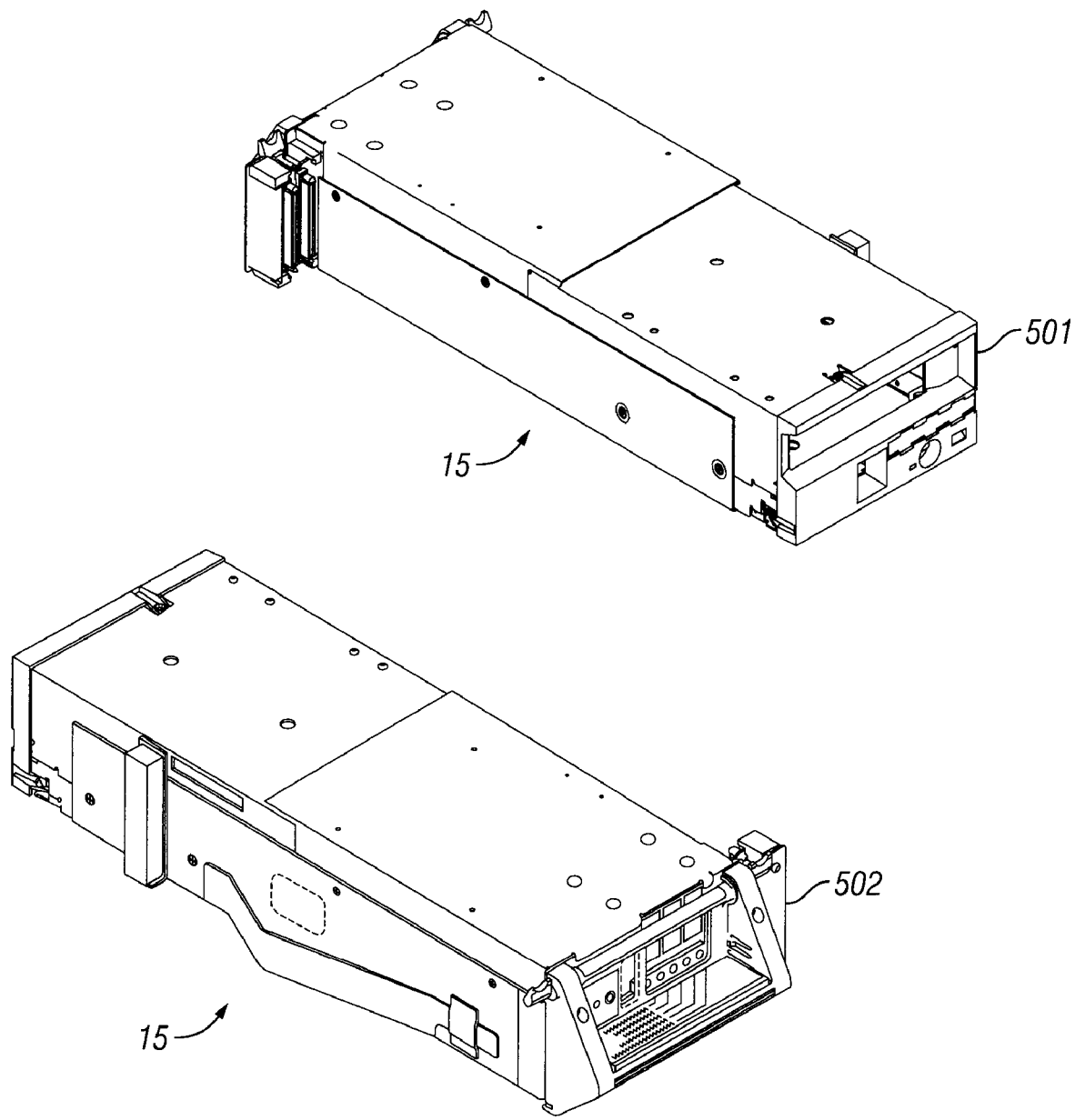
FIG. 5 is an isometric view of the front and rear of a data storage drive.
Figure 6A:
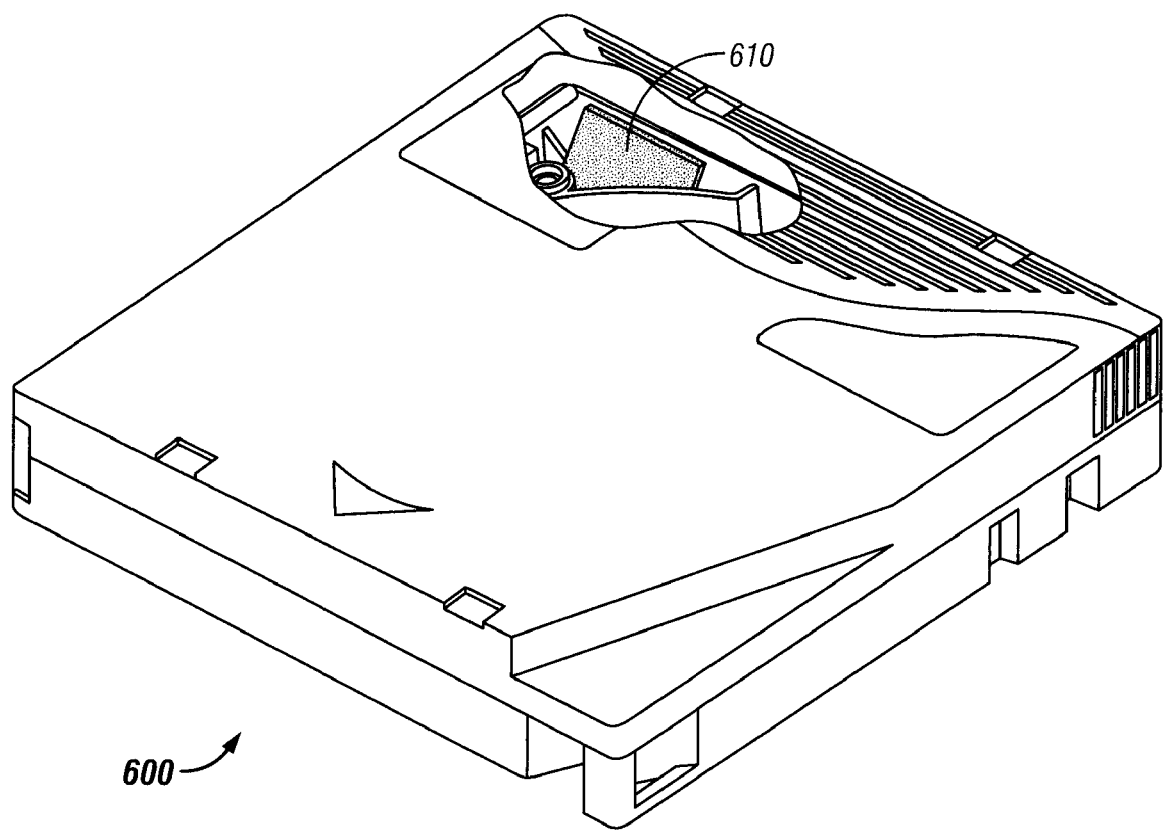
FIGS. 6A-6E are isometric views of data storage cartridges illustrating a variety of cartridge identifiers.
Figure 6B:
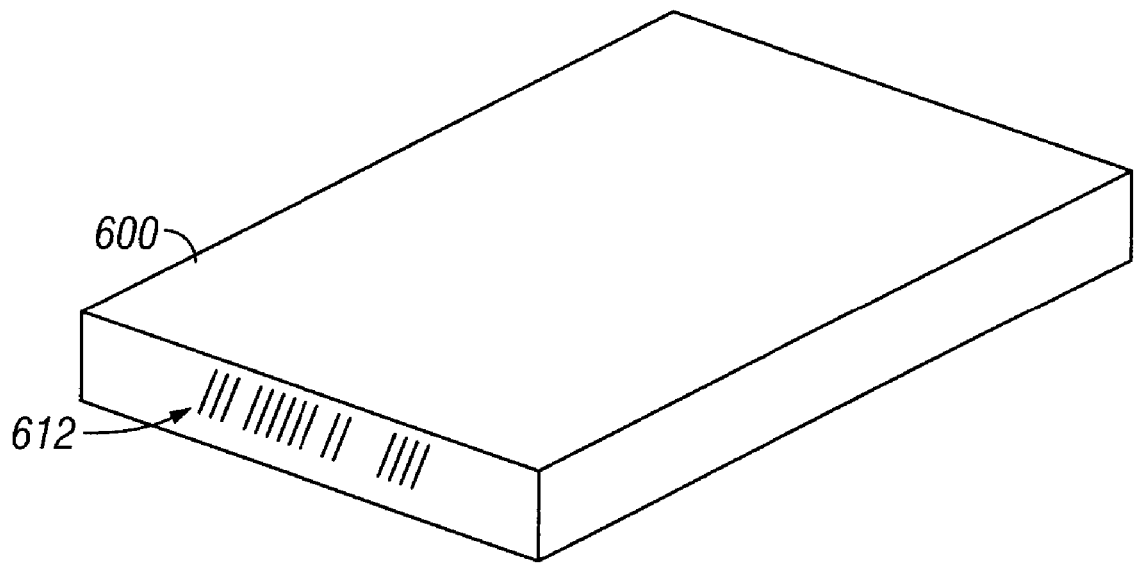
Figure 6C:
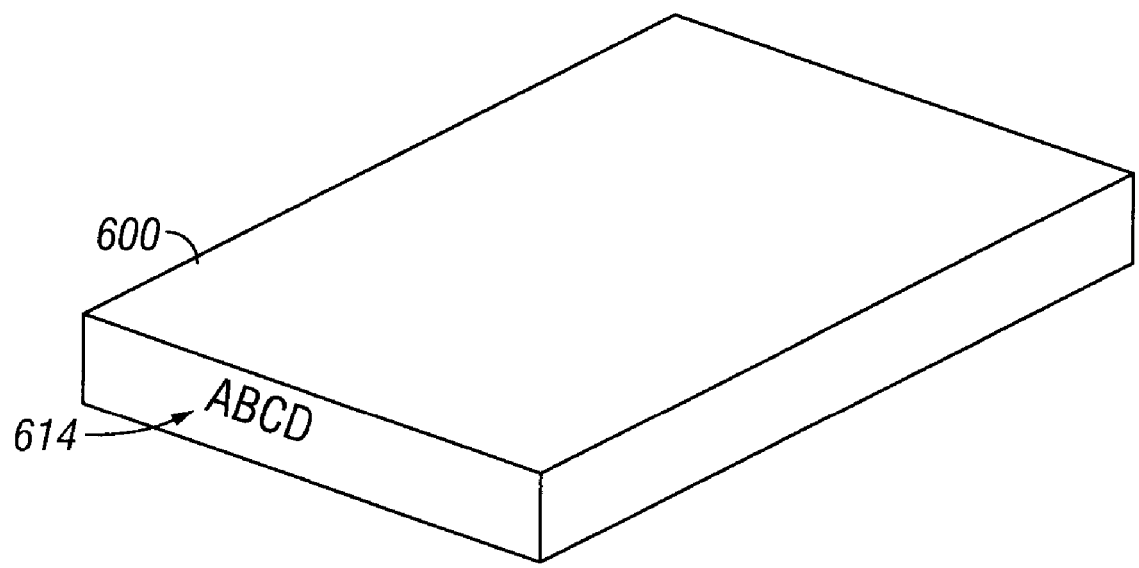
Figure 6D:
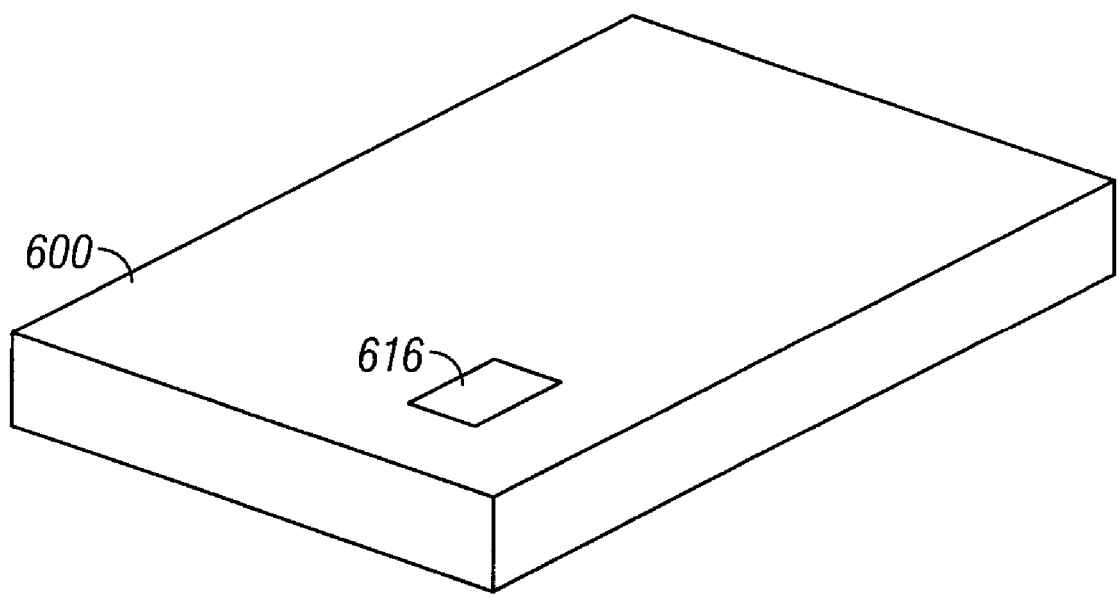
Figure 6E:
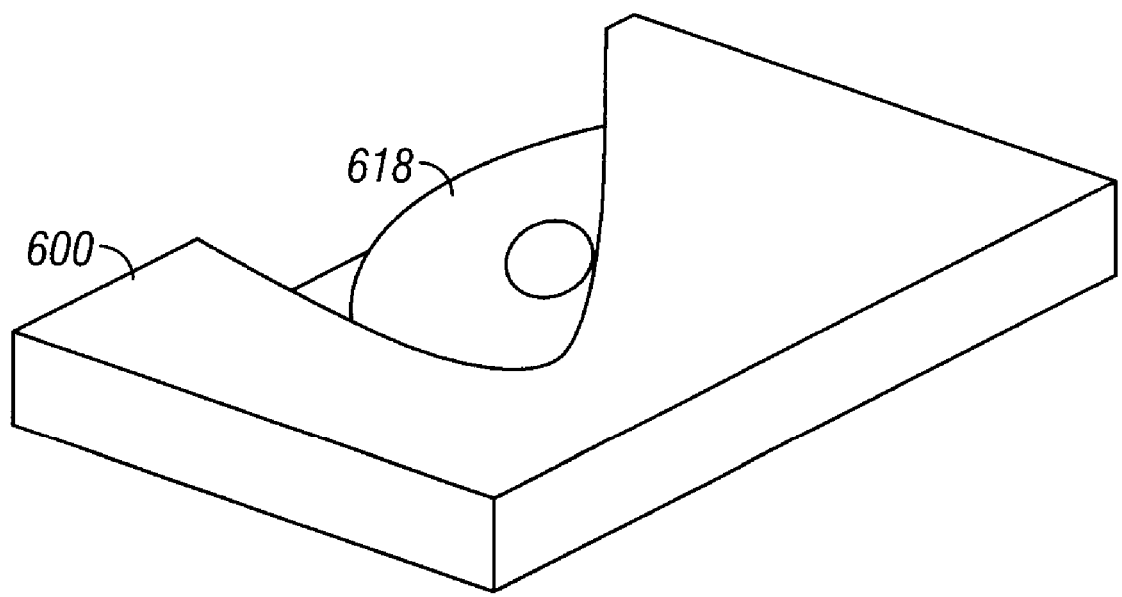

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

FIG. 6 illustrates an embodiment of a data storage cartridge 600 with a cartridge memory 610 shown in a cutaway portion of the Figure. If present, the cartridge memory 610 may comprise electrical contacts to allow the library and/or data storage drive to access the contents of the cartridge memory. Alternatively, the cartridge memory may comprise a contactless interface such as induction, radio frequency, or optical. In one embodiment, the cartridge memory comprises an RFID tag. Among other information, the cartridge memory 610 may store a value representative of an identification of the cartridge. The cartridge identification may alternatively be stored on an external machine-readable label 612 affixed to the cartridge 600 (FIG. 6B), an external human-readable label 614 affixed to the cartridge 600 (FIG. 6C), a radio frequency identification (RFID) tag 616 affixed to the cartridge 600 (FIG. 6D), stored on the media itself 618 (FIG. 6E), or combinations thereof.

Figure 7:
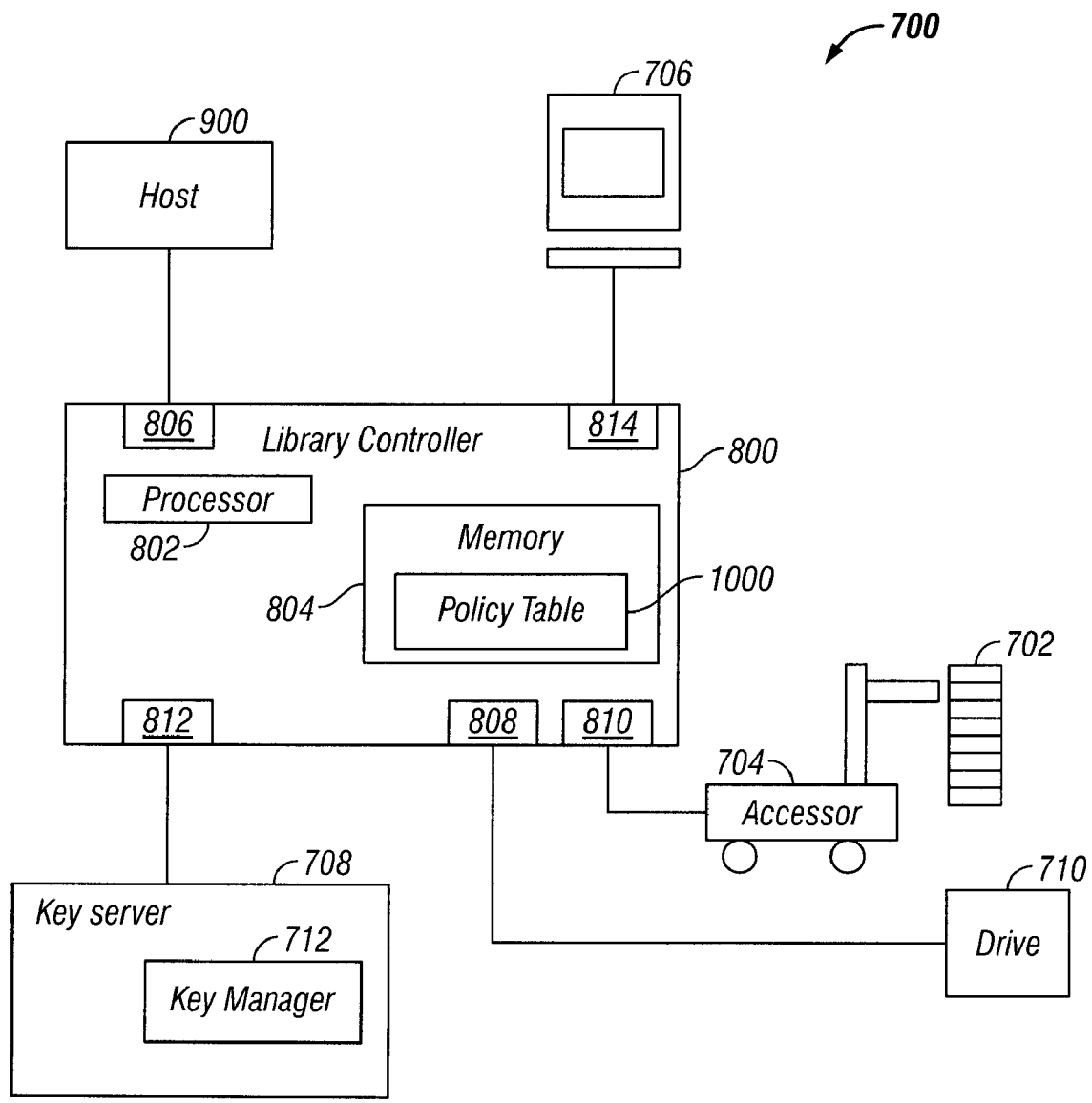
FIG. 7 is a block diagram of an automated data storage library, including one embodiment of a library controller, and a key server in which the key manager is incorporated.

FIG. 7 is another block diagram of an automated data storage library 700 attached to one or more hosts 900, and one or more key servers 708, as will be described below. The library 700 includes a library controller 800, shelves 702, in which removable media cartridges (not shown) may be stored, one or more data storage drives 710, and a robotic cartridge accessor 704 which, under the direction or control of the library controller 800, transports cartridges between the storage shelves 702 and the drive(s) 710. The library 700 may further include a user interface 706 such as an operator panel, a touch screen, a keyboard and/or display, a remote computer, web user interface, etc.

The library controller 800 includes one or more processors 802 operable to execute instructions stored in a memory 804. The library controller 800 further includes a host interface 806, a drive interface 808, an accessor interface 810, a key server interface 812 and a console interface 814. The drive 710 may comprise a host interface (not shown), and the drive interface 808 may additionally comprise a host interface, through the drive, to the library (as described above). In this case, there may or may not be a host interface 806. The connection between the library controller 800 and the drive 710 via the drive interface 808 may employ a proprietary library/drive interface (LDI) protocol, may comprise the industry standard SCSI T10 ADI (Automation Drive Interface) library/drive interface, or may comprise any library/drive interface as is known in the trade. As used herein, "library/drive interface" may refer to any interface between the library and drive.

Data storage drive(s) 710 are able to encrypt data that is being written on data storage media, and decrypt encrypted data that is read from the data storage media, based on one or more encryption policies.

A library user or administrator establishes one or more encryption policies. For each policy, the administrator may select one of several levels of encryption, including no encryption, using one encryption key, using two encryption keys, etc. For each encryption policy, the administrator may also select one or more particular encryption keys (depending on the level of security chosen). Finally, for each encryption policy, the administrator may select one or more data cartridges to associate with the policy. The cartridges are preferably identified by their respective cartridge identifiers as illustrated in FIGS. 6A-6E. As an additional level of assurance, a policy may require that a cartridge be identified by more than one identifier. Thus, it is possible to select which cartridges will have their data encrypted, and to what level, and which cartridges will have unencrypted data.

Additionally, different encryption policies may be established for different users, thereby restricting access to specified data to only those who have a need for such access. For example, certain employees of a bank may need to access stored check images but would not need to access personal customer information. Thus, a policy for such employees might include an encryption key which is different from the encryption key assigned to a policy for those higher level employees who do need to access personal customer information.

In another variation, certain encryption policies may be assigned to specific storage drives or logical libraries that contain the drives. Libraries commonly provide logical partitions or logical libraries. It is desirable to isolate one logical library from another logical library such that they appear to the attached host systems as completely separate physical libraries. This allows different host systems and/or host applications to share the same physical library. It is important that the data from one logical library is not inadvertently presented to another logical library because this could result in a security breach of the data. In addition, it could result in a loss of data because a host application may erase the data on a cartridge that it does not recognize. By assigning different encryption policies to different logical libraries, or to the drives within the logical libraries, the risk of inadvertent access to the wrong data cartridge is further reduced because the host computers associated with one logical library may not have access to the encryption key of another logical library.

In still a further variation, each drive may be assigned a default policy or key, and/or a global default policy or key may be assigned to all drives. A default key for a particular drive allows media in the drive to be encrypted with the default drive key, in the event the encryption policy does not specify a particular key. This can be useful to eliminate the need to specify a common key each time a policy is created. In addition, a global default key allows media in any drive to be encrypted with the global default key, in the event there is no drive specific default key and the encryption policy does not specify a particular key. The default key and/or the default global key may be specified by, or configured in, the library controller 800 or the key manager 712.

After the encryption policies have been entered, they may be stored in an encryption policy table, such as a table 1000 stored in the memory 804 of the library controller 800 (FIG. 7). Alternatively, the table 1000 may be transmitted by the library controller 800 to, and stored in, a memory device (not shown) in the storage drive 700. Still further, the encryption policy table may comprise one or more policies for a cartridge, and it may be stored with the cartridge to which the policy applies.

An encryption policy may further indicate application-managed encryption, system managed encryption, or library-managed encryption. With application-managed encryption, a host application determines which data and/or which cartridges should be encrypted. An example of a host application capable of application-managed encryption is the IBM Tivoli Storage Manager. With system-managed encryption, a host system component determines which data and/or which cartridges should be encrypted. Examples of a host system component include, but without limitation, an operating system, a file system, a device driver, a DLL (Dynamic Link Library), etc. With library-managed encryption, a library determines which data and/or which cartridges should be encrypted.

Figure 8:
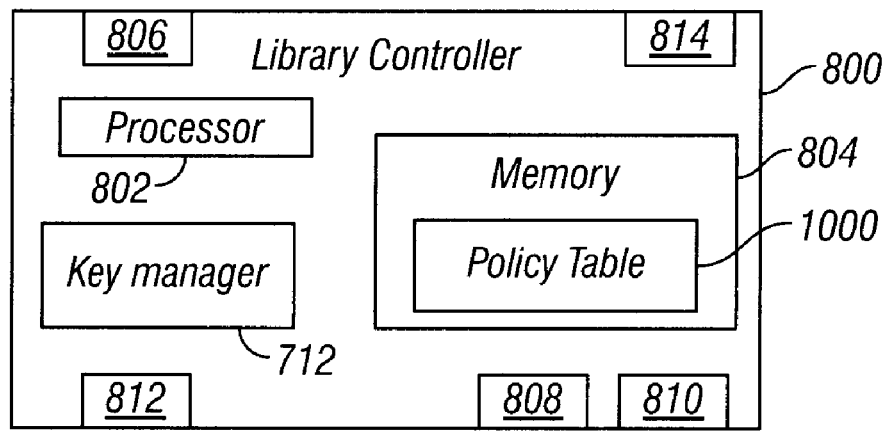
FIG. 8 is a block diagram of an embodiment of a library controller in which the key manager is incorporated.
Figure 9:
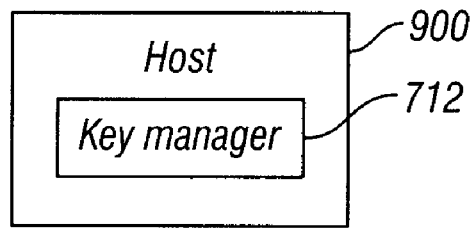
FIG. 9 is a block diagram of a host device in which the key manager is incorporated.
Figure 10:
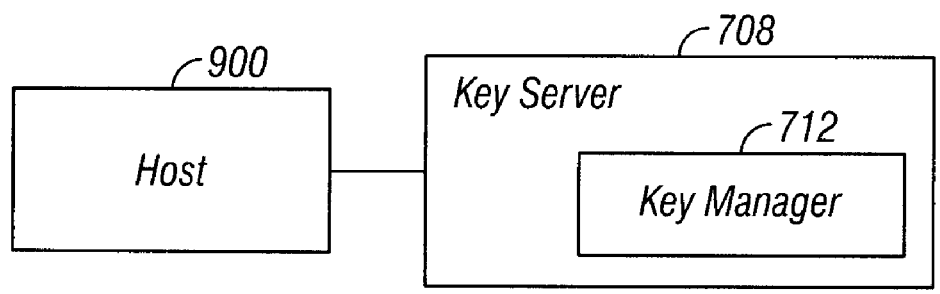
FIG. 10 is a block diagram of a host device that is coupled to a key server in which the key manager is incorporated.

Encryption keys are stored in the key server 708, the key manager 712, or in a key store (not shown) coupled to the key server 708 and/or the key manager 712, in a secure manner. As used herein, "key server" and "key manager" may additionally refer to any key stores associated with them. A key store may comprise a software element such as an array, structure, database, file, etc. In addition, a key store may comprise a hardware element such as memory, media, a hard drive, storage device, etc. The key server 708 may be a dedicated PC or server (as illustrated in FIG. 7) and may be coupled to the library controller 800 by any known means such as, but not limited to, serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, the key server 708 may be coupled to the library controller 800 through network or wireless interfaces such as Ethernet, CAN (Controller Area Network), 802.11 (Wi-Fi), X.25 (WAN), Bluetooth, etc. In one example, the key server 708 is coupled to the library controller 800 with an Ethernet network employing TCP/IP. The key server 708 and/or key manager 712 may also be integrated into the library 700 (not shown), or the library controller 800 (FIG. 8), or the host 900 (FIG. 9), or coupled to the host 900 (FIG. 10). In the case where there is no key server 708, the coupling between the key manager 712 and the library controller 800 (FIG. 8), or between the key manager 712 and the host 900 (FIG. 9), may comprise a logical coupling with no physical interface.

The one or more key servers 708 each include key manager 712. The key manager 712 may comprise hardware, such as FPGAs (Field Programmable Gate Arrays), ASICs (Application Specific Integrated Circuits), discrete logic or circuits, processors, controllers, etc. Additionally or alternatively, the key manager 712 may comprise software, such as modules, functions, routines, code, instructions, etc. The key manager 712 may assist encryption-enabled data storage drives 710 in generating, protecting, storing, distributing, and maintaining encryption keys that are used to encrypt information being written to, and decrypt information being read from, data storage media. Alternatively, the keys may be used to encrypt and/or decrypt other keys. The key manager 712 may support numerous data storage drives 710 regardless of where those data storage drives reside (e.g. in an automated data storage library 700, in other data storage libraries, connected to mainframe systems through channel connections, installed in other computing systems such as a Virtual Tape System, etc.)

In an example where a policy table, such as policy table 1000 is used to provide encryption based on a cartridge identifier, the host 900 (FIG. 7) transmits a request to the library controller 800 to access a specified cartridge. The library controller 800 either directly controls, or transmits a command to, the accessor 704 to transport the cartridge from a storage shelf 702 to the drive 710. The accessor 704 may have a reader (such as a bar code reader, a camera, an RFID reader, etc.) with which to read or otherwise obtain one or more cartridge identifiers from the cartridge before, during, or after it is moved from the storage shelf 702 to verify the identity of the cartridge.

In one embodiment, in which the encryption policy table 1000 is stored in the library controller 800 (FIG. 7), the cartridge identifier information is read by, or transmitted to, the library controller 800. The library controller 800 compares the identifier to identifiers in the table 1000. If the identifier is a match to the identifiers in the encryption policy table 1000, the library controller 800 initiates communications with either the drive 710 or the key manager 712 to provide the encryption key(s) required by the appropriate encryption policy to the drive 710. If the initiated communication is to the drive, it may be in the form of a key identifier for the required key, or it may be a signal to the drive 710 that encryption is required. The drive 710 may then use this identifier or signal to request a key. Alternatively, the communication to the drive 710 may be in the form of policy information, such as the cartridge identifier. The drive 710 may compare a cartridge identifier supplied by the library controller 800, to the cartridge identifier obtained by the drive 710, to determine what key (if any) to request. If the initiated communication is to the key manager 712, it may be in the form of a key request. In this embodiment, the communications between the drive 710 and the key manager 712 may go through the library controller 800, serving as the key manager 712, or as a key proxy for the key manager 712.

The library controller 800 being a key proxy for the key manager 712 refers to the fact that the library controller 800 provides a path or vehicle for establishing communication between the drive 710 and the key manager 712. For example, the library/drive (more specifically, the library controller/drive) interface 808 may comprise the SCSI T10 Automation Drive Interface (ADI) over RS-422. The key server and/or the key manager interface 812 may comprise a TCP/IP interface over Ethernet. As a key proxy, the library controller 800 may provide the protocol conversion between the drive ADI protocol and the key server TCP/IP protocol. In addition, the library controller 800 may provide more functionality than just protocol conversion. For example, the drive key request to the library controller 800 may comprise a different request than the key request from the library controller 800 to the key manager 712. In other words, the command and data information may be completely different between the drive 710 and key manager 712 such that simple protocol conversion is not sufficient to bridge the communication. Alternatively, the communications between the drive 710 and the key manager 712 may go through a host computer device driver, operating system, file system or some other software on the host computer. For example, a device driver on the host computer may be a proxy between the drive 710 and the key manager 712. After the drive 710 has received the key(s), it may then encrypt data being written to the media within the specified cartridge in accordance with the key(s).

The key manager 712 processes key generation or key retrieval requests. In particular, when a data storage drive 710 is to write encrypted data, the data storage drive 710 first requests an encryption key from a key manager 712. Upon receipt of the request, the key manager 712 generates, recovers, retrieves, reads, or otherwise obtains an encryption key (e.g. an Advanced Encryption Standard (AES) key) and serves the encryption key to the data storage drive 710.

When an encrypted data storage medium is to be read, the library controller 800 or the data storage drive 710 sends a request to retrieve the key needed to read the data storage medium. In some embodiments, the drive 710 may also send a protected key read from the data storage medium to the key manager 712. In this case, the key manager 712 unwraps (decrypts) the wrapped (protected) key to access the secret key and then rewraps (encrypts) this secret key with another key for secure data transfer back to the data storage drive 710. The data storage drive 710 then unwraps the rewrapped key to access the secret key, which is used to decrypt the data stored on the data storage medium.

Multiple key managers 712 may be provided to enable high availability (i.e. if one key manager 712 is unavailable, another may be used by a data storage drive 710).

The key path indicates the path or particular interface through which the encryption keys should be transmitted. Alternatively, the key path may comprise a particular key server or a particular key manager through which the keys should be transmitted. A key server and/or key manager may be identified by an IP address, MAC address, World Wide Name, host name, alias, port number, a particular communication channel, or any other method of identifying one device from another. Still further, the key path may comprise an encryption policy such as application-managed, system-managed, library-managed, wherein the method is an indicator of the path. For example, the encryption method may comprise "system" to indicate that that a system component determines when encryption should be performed and the key path may comprise "library" to indicate that any needed keys will come from the library.

The key path may be the same as the encryption method. For example, in library-managed encryption, the library controller 800 specifies which data should be encrypted and the library controller 800 may also provide the encryption keys to the data storage drive 710 either as a proxy or as a key manager 712. Alternatively, the key path may be different from the encryption method. For example, in system-managed encryption, a host system component may specify which data should be encrypted, and library controller 800 and may actually provide the encryption keys to the storage drive 710.

This process of encryption has been described with the drive 710 initiating communications with the key manager 712. It should be noted that the library controller 800 may initiate communication with the key manager 712. For example, if the library controller 800 knows the policy for a particular drive 710, it may request the appropriate key(s) from the key manager 712 and present the key(s) to the drive 710. In this disclosure, references to transmit, transmits, transmitted, or transmitting refers to the transfer of information over an interface, or from one component, device, or object to another. References to entering an encryption policy may refer to the selection, input, or creation of a policy. For example, an operator may enter a policy at a user interface of a library. In another example, a policy may be entered when a label is printed, manufactured, or otherwise created. This system was described as having a cartridge encryption policy where certain cartridges may be encrypted and certain cartridges are not encrypted. Alternatively, an encryption policy may be all or none, such that all cartridges are encrypted or no cartridges are encrypted. In addition, the policy may be all or none based on the drive, such that the use of certain drives provides encryption and the use of other drives does not provide encryption. Still further, the policy may be all or none by logical library, such that certain drives and/or cartridges provide encryption because of the logical library that they are associated with. One skilled in the art will recognize that there are other encryption policies that could be employed. The particular encryption policies that may be used will not affect the scope of this invention and no limitation should be implied.

As understood from the above description the encryption process requires multiple processors and/or communication paths that increase the complexity of the automated storage library. Therefore when an error occurs during a request for an encryption key it is difficult to isolate where the problem occurred.

Figure 11:
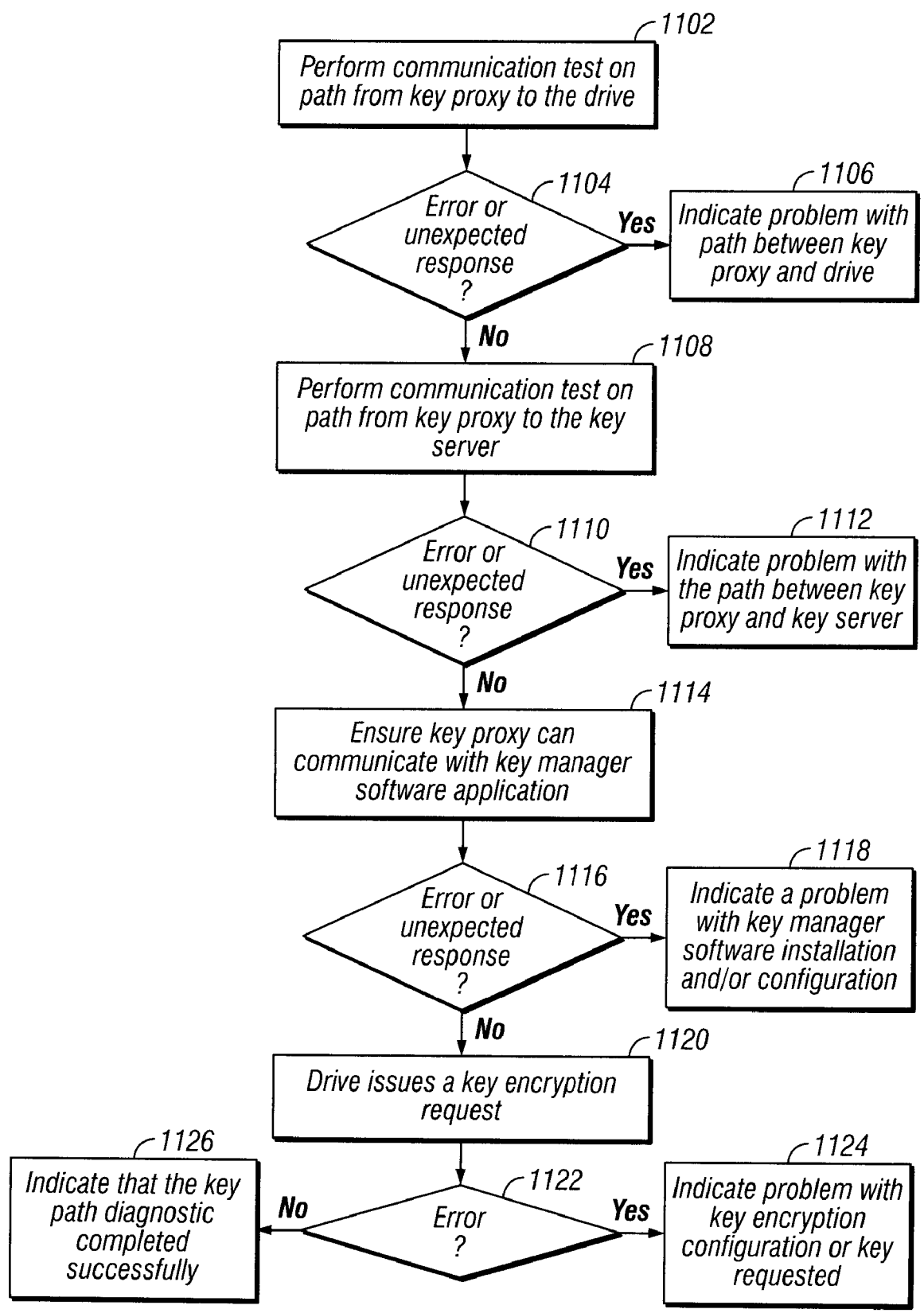
FIG. 11 is a process flow diagram of an embodiment of key path diagnostic.

FIG. 11 is a flowchart illustrating the steps to implement a key path diagnostic to aid in isolating an error within the encryption system. In one embodiment library controller 800, host 900, device driver (not shown), application program (not shown), or another computer (not shown) initiates one or more diagnostics, or performs actions, to test the key path for obtaining encryption keys. For example, a remote diagnostic computer may initiate the key path diagnostic. In another example, the library controller 800 may initiate the key path diagnostic at reset or power-on. Alternatively, the key path diagnostic may be initiated through an event that is detected by the library controller 800, host 900, device driver (not shown), application program (not shown), or another computer (not shown). For example, the library controller 800 may detect that a drive 710 has been moved or swapped with another drive, and may initiate the key path diagnostic. Further, the key path diagnostic may be initiated by at least one element of the storage system detecting an unexpected event or response or as a result of an error associated with the data storage system. For example, the library controller 800 may detect a communication error with the drive 710, key server 708, or key manager 712, and may initiate the key path diagnostic. The detection of this event may be a trigger to initiate a key path diagnostic for any affected drives.

In another embodiment the testing or diagnostics may be initiated by a user at a user interface (for example, user interface 706) at a library controller 800, host 900, device driver (not shown), application program (not shown), or another computer (not shown). The user interface may comprise an operator panel, web user interface, diagnostic interface, remote computer interface, etc. For example, a user may open a library web user interface and select a key path diagnostic. The key path diagnostic may be run against a key manager 712, one or more drives 710, or against the entire system in general.

In a further additional embodiment, the key path diagnostic may be initiated at any periodic interval. For example, the library may run a key path diagnostic every day, or every day that the path has not been used, once a week, etc. The storage device element (e.g. library controller 800, host 900, device driver, operating system, application program, or another computer) or the user interface that initiates the key path diagnostic is hereinafter referred to as the diagnostic initiator. In addition, the key proxy may comprise any storage device element, and not necessarily the same device element that may comprise the diagnostic initiator.

The key proxy, or a data storage drive, receives a command or indication from the diagnostic initiator to perform a communication test of one or more communication paths between the key proxy and the drive 710. The key path diagnostic begins at step 1102. In step 1102 a communication test is performed on the path from the key proxy to the drive. In one embodiment the key proxy may simply try to communicate with the drive 710. The communication test from the key proxy to the drive 710 may be a periodic check that is currently done on the system as a background check, rather than an explicit step of the key path diagnostic. For example, in the case where the library controller 800 is acting as a key proxy, current automated tape libraries may already have a periodic check of the communication path between the library controller 800 and the drive 710. In this case, step 1102 is independently or indirectly performed as another aspect of system operation, and may be omitted from the key path diagnostic.

In step 1104, if the communication test from the key proxy to the drive 710 detects an error or an unexpected response, the process flows to step 1106 in which the error may be returned to the diagnostic initiator. In response, the diagnostic initiator may indicate that there is a problem with the path between the key proxy and the drive 710, and the key path diagnostic may end. For example, in the case where the key proxy comprises the library controller 800 and the diagnostic initiator comprises a user interface such as an operator panel 706, the operator panel would indicate that there is a problem with the communication path between the library controller 800 and the drive 710. More specifically, this may indicate a communication problem with interface 808.

In an additional embodiment, one or more errors may be returned in step 1106 and the process may still continue to step 1108. For example, there may be more than one path between the key proxy and the drive 710, and one or more of these paths may have passed the communication test, while one or more may have failed. In this case, it may be desired to continue the key path diagnostic. In the embodiment in which the communication test between the key proxy and drive is performed independently of the key path diagnostic (as discussed above), the results of a prior communication test may be reported at step 1106. Alternatively, steps 1102, 1104, and/or 1106 may be omitted as discussed above.

If there is no error detected, or an expected response is returned in step 1104, then the process flow continues to step 1108. Alternatively, if available, another path from the key proxy to the drive 710 may be tested in the same manner as described in step 1102.

In step 1108 the key proxy performs a communication test on the path between the key proxy and the key server 708. The test may comprise a ping test, a node guard check, an acknowledgement of receipt of a network packet, a packet exchange, an exchange of data or other information, or any other Ethernet, network, or communication test as is understood by one of ordinary skill in the art.

For example, as understood by one of ordinary skill in the art, a ping test is a computer network tool used to test whether a particular host is reachable across an IP network. Ping works by sending ICMP "echo request" packets to the target host and listening for ICMP "echo response" replies. Using interval timing and response rate, ping estimates the round-trip time and packet loss (if any) rate between hosts. More generally any packet, such as a TCP, UDP or LDI packet may be sent to the key server 708 and/or the key manager 712, and the key server 708 and/or the key manager 712 responds accordingly. As is understood by one of ordinary skill in the art a packet is a formatted block of information carried by a computer network.

In step 1110 if the communication test between the key proxy and the key server 708 detects an error, or an unexpected response, the process flows to step 1112. In step 1112 the diagnostic initiator indicates that there is a problem with the path between the key proxy and the key server 708 and the key path diagnostic ends. Alternatively, if available, another path from the key proxy to the key server 708 may be tested in the same manner as described in step 1108.

In some embodiments there are cases where the key path diagnostic does not end, even though all tested paths from step 1108 produced errors or unexpected results. For example, some servers disable the ability to respond to a ping to reduce the chance of a DoS (Denial of Service) attack or discovery. If the communication test of step 1108 involved a ping test, then a test failure may simply mean that ping capability has been disabled. In this case another test may be performed to further diagnose the problem, or the key path diagnostic may continue to step 1114 in spite of the error(s).

If there is no error detected, or an expected response is returned in step 1110, it is determined that there is a valid path between the key proxy and the key server 708 and the process then continues to step 1114. Alternatively, if available, another path from the key proxy to the key server 708 may be tested in the same manner as described in step 1108.

In step 1114 the key path diagnostic ensures that the key proxy can communicate with the key manager 712. If the key proxy can communicate with the key manager 712 the key manager is properly installed and configured, and thus verifies the installation and configuration parameters related to the key manager 712. In one embodiment, the key proxy attempts to communicate with the key manager 712. The key proxy may issue a no operation (NOP) command, an illegal command, a key request, or any other communication to the key manager 712. Therefore, when the key manager 712 returns a response, it is confirmed that the key manager 712 is installed and configured properly. In another embodiment, the diagnostic initiator or the key proxy directs the drive 710 to communicate with the key manager 712. In response, the drive attempts communication with the key manager 712. Upon receiving this command the drive may issue a no operation (NOP) command, an illegal command, a key request, or any other communication to the key manager 712. Therefore, when the key manager 712 returns a response, it is confirmed that the key manager 712 is installed and configured properly.

If the key manager 712 does not respond, or returns an unexpected response to the drive 710 or to the key proxy in step 1116, the process then flows to step 1118. Since it was determined in step 1102 that there was an operational communication path between the key proxy and the drive, and it was determined in step 1108 that there was an operational communication path between the key proxy and the key server, any failure to get a response from the key manager 712 indicates a specific problem with the installation or configuration of the key manager 712. In step 1118 the drive 710 or the key proxy sends the return status indicating a problem with the installation or configuration of the key manager 712 to the diagnostic initiator. The diagnostic initiator indicates that there is problem with the installation or setup of key manager 712 and the key path diagnostic ends. Alternatively, if available, another key manager and/or another key server may be tested in the same manner as described in step 1114.

If an expected response is returned in step 1116, then it is determined that the key manager 712 is properly installed and configured and the process continues to step 1120.

In step 1120, an encryption key request is made to the key manager 712. In one embodiment, the key proxy issues the key request to the key manager 712. In another embodiment, the drive 710 is used to issue the key request to key manager 712. In the former embodiment, the key proxy may issue a key manager check command to the drive 710. In response to the key manager check command the drive 710 issues a standard key generation request to ensure that the whole key request process is operational. An operational key request process provides the ability to request a key from a key manager, and transfer that key to a particular drive for encryption and/or decryption of data.

If the key encryption request test of step 1120 does not return a key then the process flows to step 1124. Since it was determined in step 1102 that there was an operational communication path between the key proxy and the drive, and it was determined in step 1108 that there was an operational communication path between the key proxy and the key server, and further it was determined in step 1114 that the key manager 712 was properly installed and configured, then any failure to get a key from the key manager 712 would indicate a specific problem with the installation or configuration of the key manager 712 as it relates to the particular drive 710 that the key is being requested from or for, and/or the particular key being requested. In step 1124, status indicating a problem with installation or configuration of the drive and/or the requested key at the key manager 712, is returned to the diagnostic initiator accordingly.

If there is no error detected or an expected response is returned in step 1122, it is determined that the key manager 712, the drive 710, and the key are properly configured and installed properly and that all the paths for the key encryption are connected and operational and the process flow continues to step 1126. In step 1126 the diagnostic initiator indicates that the key path diagnostic has completed successfully or partially successfully. Partial success would be indicative of a good communication path with some paths in error. For example, there may be redundant communication paths between a key proxy and a key manager, and one of these paths could be good while another path is bad.

Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of the processes described herein may be performed in any order practical. Further, some steps may be performed simultaneously, in parallel, or concurrently.

Moreover, some steps may be omitted. For example, in one embodiment the first step of testing the communication path from the drive 710 to the key proxy (step 1102) may be omitted. In a further embodiment the fourth step of requesting a key (step 1120) may be omitted.

At any point along the key path diagnostic process, the drive 710 may report the path status to the key proxy that initiated the test. Path status may comprise a simple pass or fail result. In an alternative embodiment, the path status may comprise information to help diagnose the nature and/or the location of the failure.

In one embodiment the automated data storage system is utilizing library managed encryption in which the library controller 800 is the key proxy. In other embodiments the automated data storage system may utilize system managed encryption in which the device driver (not shown), file system (not shown), operating system (not shown), etc. may act as the key proxy. Moreover the library controller 800 may comprise the diagnostic initiator or in other embodiments the device driver (not shown), file system (not shown), operating system (not shown), the drive 710, another computer or controller, etc. may initiate the key path diagnostic.

The key path diagnostic has been described with respect to testing a single drive 710 within the automated data storage library 700. It should be understood that the key path diagnostic may also be performed on a group of drives, such as every drive within a particular logical library, every drive in a particular frame, or every drive in the entire library 700.

The key path diagnostic has been described to end after an error or unexpected response is returned on any of the steps 1102, 1108, 1114, or 1120. However, in an additional embodiment the key path diagnostic may continue onto the next step when an error or unexpected result is returned. By continuing on to the next step the key path diagnostic may determine additional problems with the key path and/or to determine if the error returned may be a false error. One example of a case when a user may receive a false error is when ping is disabled, as was discussed. In step 1108 if ping is disabled and a ping test is performed, the key proxy may return an error even though the key path from the key proxy to the key server 708 may be operational. In this embodiment the process would continue to step 1114 in which the key path diagnostic would ensure that the key proxy can communicate with the key manager 712. If the expected response is returned in step 1116 then it is determined that the error in step 1108 was a false error since the key proxy would not be able to communicate with the key manager 712 unless the key path from the key proxy to the key server 708 was operational.

Further, while the key path diagnostic was discussed with respect to a single key server 708, a single key manager 712, and a single path between each automated data library element, it is understood by one skilled in the art that redundant key servers, key managers, and paths may be present. Moreover the key path diagnostic may be run on each automated data library element and each path connecting each automated data library element. For example, in the case where there are multiple key servers, step 1108 may be performed on all key servers before continuing on to step 1114. Alternatively, all of the steps of the key path diagnostic may be performed on a single key server and then repeated for each additional key server thereafter.

Figure 12:
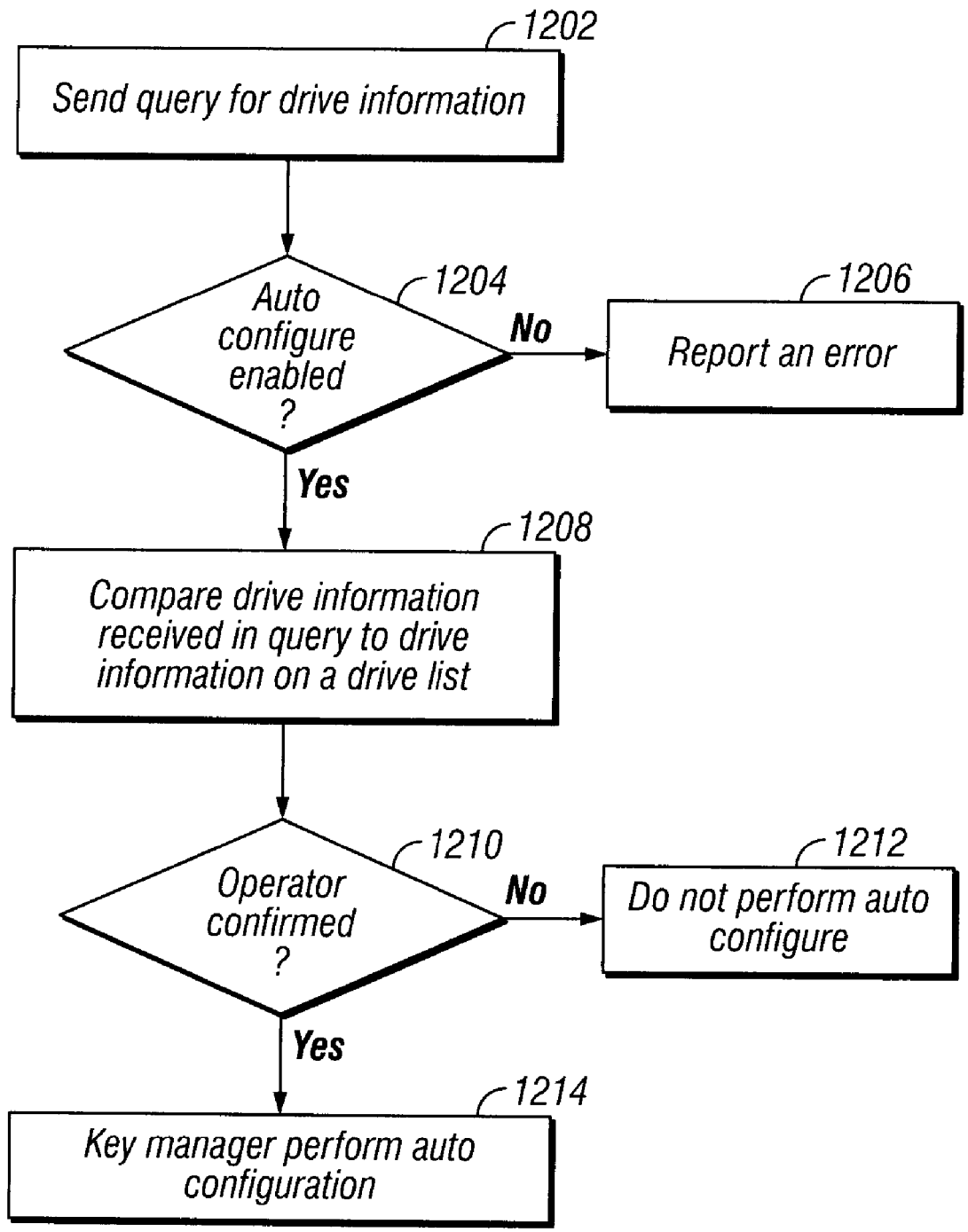
FIG. 12 is a process flow diagram of an embodiment to auto configure a list of drives.

FIG. 12 is a flowchart illustrating the steps to implement auto configuration of a drive list. The drive list is a list of drives that are authorized, and therefore, may obtain keys from the key manager 712, and consequently may perform encryption and/or decryption of data storage media. The method of auto configuring a drive list is advantageous in the field of automated data libraries, such as tape libraries. In the current method of creating a drive list an operator manually enters each drive and the drives' related information (e.g. the drive serial number, world wide name, etc.). For example, a particular automated tape library may have up to 192 drives, and a key manager 712 may serve multiple libraries. Therefore, the operator would be required to enter each drive and the related information for hundreds, and possibly thousands of drives. The method of auto configuring greatly simplifies the process of adding drives to the key manager 712 because all the necessary information may be routed through the communication path between the drive 710 and the key manager 712 during the key path diagnostic. Thus, the chance of human error, and the time consuming and the sometimes complicated task of manually entering the drive and the drive's related information is eliminated.

In step 1202, a query is sent for drive information. In one embodiment the query for drive information may be a request sent by the key manager 712. In another embodiment, the information is sent without query by the key manager 712, and may be accomplished within the key manager 712 by running the key path diagnostic as described in FIG. 11. For example, in step 1120 the drive 710 may issue a key encryption request, and in doing so the drive may provide information that may be used for adding the drive to a drive list.

In another embodiment the query for drive information may be a query sent by the key manager 712 to all drives interconnected with the key manager. The drive information may comprise any identifying information about the drive, such as the world wide name (WWN), drive serial numbers, a digital signature associated with the drive, a certificate associated with the drive, etc.

An auto configure function may be enabled or disabled based on a customer's needs. For example, during the setup of an automated data library with encryption it would be advantageous to enable the auto configure function in order to simplify the process of adding drives to the key manager 712. However, after the automated data library is configured it may be advantageous to disable the auto configure function in order to increase security.

In optional step 1204, if it is determined that the auto configure function is disabled, the process flows to step 1206 in which the key manager 712 reports an error to one or more user interfaces. Alternatively or additionally, an error may be returned to the diagnostic initiator. For example, step 1120 of FIG. 11 may return an error to the diagnostic initiator if an encryption key request failed because the drive was not in the drive list and an auto configure function was disabled.

If it is determined in step 1204 that the auto configure feature is enabled the process flows to step 1208. In step 1208 the key manager 712 compares the drive information received in a query, or in a key request, to drive information in a drive list. For example, this may comprise the key manager 712 comparing the world wide name or serial number of the drive that has issued a key request to the world wide name or serial number of drives that are currently on the drive list. Once the drive information has been compared to drive information in a drive list, the key manager 712 determines which drives are not currently on the drive list.

Step 1210 describes an optional step of requesting operator's confirmation to auto configure or add one or more drives to the drive list. Specifically, in one embodiment, once it is determined which drives are currently not on the drive list a user interface may display the list of drives that are not currently on the drive list. The user interface may request confirmation to add the one or more drives to the drive list. This may be implemented by a simple yes or no on the display of the user interface or a box that may be checked or unchecked to add and/or remove the drive next to each drive on the display of the user interface. As understood by one of ordinary skill in the art the user interface may allow the operator to choose one, a portion, or all of the drives displayed on the user interface.

If in step 1210 the operator does not confirm the auto configure process then the process flows to optional step 1212 in which the one or more drives are not auto configured and are not added to the drive list.

If in step 1210 the operator does confirm the auto configure process then the process flows to step 1214 in which the key manager 712 may add the one or more drives to the drive list such that the drives are now authorized and are able to request and/or receive encryption keys.

In another embodiment, once it is determined that one or more drives are not authorized drives (i.e. a drive that is not in the drive list) the key manager 712 may add the one or more drives to the drive list automatically, without operator confirmation. The one or more drives added to the drive list are now authorized and are able to request and receive encryption keys.

In still a further embodiment, the step of requesting a key (for example step 1120 of the key path diagnostic) may be utilized to confirm that a key is labeled correctly and the key is present in the key store (not shown). The encryption process has the concept of user specified keys, default drive keys, and global default keys as explained above. Each key has a name or alias called a key label. When creating an encryption policy, an operator may enter a key and corresponding key label into the key manager 712, and may also enter the key label into the library controller 800. Because the process requires an operator to manually enter a key label, the process may be exposed to human error (e.g. the key label may be misspelled when it is entered into the library controller 800). Therefore, the process of step 1120 of requesting a key confirms or disproves that the key label is correct, or that the key is available on the key manager 712 or key store (not shown).

In an alternative embodiment in which the user has not specified a key, step 1120 may confirm or disprove that the drive default key and/or the global default key has been configured correctly in the key manager 712. For example, in step 1120 the drive 710 and/or the library proxy may issue a request for an encryption key. In response, the key manager 712 determines if there is a user specified key. If there is no user specified key, the key manager 712 checks to determine if there is a drive default key. If the key manager 712 determines that there is no drive default key the key manager 712 may check to determine if there is a global default key. If there is no global default key, step 1120 returns an error and the process will flow to step 1124.

While the present embodiment has been described with respect to drive default keys and global default keys it should be recognized that default keys may be created for any logical grouping or section of the automated data library 700. For example, one may create a default key for a logical library, for a frame, or any other portion of the library 700.

It is important to note that while the present embodiments have been described in the context of a fully functioning data processing system, those of ordinary skill in the art will appreciate that the processes of the present embodiments are capable of being distributed in the form of a computer readable medium of instructions and a variety of forms and that the present embodiments apply regardless of the particular type of signal bearing media actually used to carry out the distribution. Examples of computer readable media include recordable-type media such as a floppy disk, a hard disk drive, USB flash drives, tape cartridges, and CD-ROMs and transmission-type media such as digital and analog communication links.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Moreover, although described above with respect to methods and systems, the need in the art may also be met with a computer program product containing instructions for encrypting data on a removable media cartridge. Furthermore, it is to be understood that the invention is solely defined by the appended claims.

What is claimed is:

1. A data storage system comprising:
   at least one drive;
   a key proxy;
   a key server;
   a key manager;
   a processor coupled to said at least one drive, wherein said processor is configured to:
      perform a first communication test on a path between said key proxy and said at least one drive;
      perform a second communication test on a path between said key proxy and said key server;
      attempt communication with said key manager in said data storage system by sending a command to said key manager;
      wherein said first communication test verifies that said path between said drive and said key proxy is operational and said second communication test verifies that said path between said key proxy and said key server is operational;
      wherein said communication attempt with said key manager verifies installation and configuration parameters related to said key manager; and
      wherein performing said second communication test on said path between said key proxy and said key server is performed by sending a packet from said key proxy to said key server and receiving a response from said key server.

2. The data storage system of claim 1, wherein said key server comprises said key manager.

3. The computer data storage system of claim 1, further configured to send a request for a key to said key manager, wherein said request for said key is sent by one of said drive and said key proxy.

4. The data storage system of claim 3, wherein said key is one of an operator defined key, a drive default key or a global default key.

5. The data storage system of claim 1, wherein said key proxy is one of a library controller, a device driver, a file system, or an operating system.

6. The data storage system of claim 1, wherein said command is one of a no operations command (NOP), a request for information, a request for status, a key request, a valid key manager command, or an illegal command for which the expected response would be an error.

7. A data storage system comprising:
   at least one drive;
   a key proxy;
   a key server;
   a key manager;
   a processor coupled to said at least one drive, wherein said processor is configured to:
      perform a first communication test on a path between said key proxy and said at least one drive;
      perform a second communication test on a path between said key proxy and said key server;
      attempt communication with said key manager in said data storage system by sending a command to said key manager;
      wherein said first communication test verifies that said path between said drive and said key proxy is operational and said second communication test verifies that said path between said key proxy and said key server is operational;
      wherein said communication attempt with said key manager verifies installation and configuration parameters related to said key manager; and
      wherein said key manager comprises a drive list, said drive list identifies drives that may obtain keys from said key manager.

8. The data storage system of claim 7, further configured to auto configure said drive list wherein said auto configure is performed by adding said drive to said drive list in response to said drive not being in said drive list.

9. The data storage system of claim 8, wherein said auto configure feature may be enabled or disabled.

10. A data storage system comprising:
    at least one drive;
    a key proxy;
    a key server;
    a key manager;
    a processor coupled to said at least one drive, wherein said processor is configured to:
       perform a first communication test on a path between said key proxy and said at least one drive;
       perform a second communication test on a path between said key proxy and said key server;
       attempt communication with said key manager in said data storage system by sending a command to said key manager;
       wherein said first communication test verifies that said path between said drive and said key proxy is operational and said second communication test verifies that said path between said key proxy and said key server is operational;
       wherein said communication attempt with said key manager verifies installation and configuration parameters related to said key manager; and
       wherein said first communication test, said second communication test, and said attempting communication with said key manager are initiated by one of an operator, a periodic check of said data storage system, as a result of an error associated with said data storage system, and at least one element of said data storage system detecting an unexpected event or response.

11. The data storage system of claim 10, wherein said at least one element of said data storage system, is one of a library, a host, a device driver or an application program.

* * * * *